United States Patent
Hsiao

(10) Patent No.: US 7,609,338 B2
(45) Date of Patent: Oct. 27, 2009

(54) BACKLIGHT MODULE WITH LIGHT REFLECTOR HAVING PLURAL REFLECTION CAPABILITY AND LIQUID CRYSTAL DISPLAY USING SAME

(75) Inventor: Chih-Chung Hsiao, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 185 days.

(21) Appl. No.: 11/982,945

(22) Filed: Nov. 5, 2007

(65) Prior Publication Data
US 2008/0106674 A1 May 8, 2008

(30) Foreign Application Priority Data
Nov. 3, 2006 (TW) .............................. 95140741 A

(51) Int. Cl.
*G02F 1/1335* (2006.01)
(52) U.S. Cl. ............................... 349/65; 349/61; 349/70
(58) Field of Classification Search .................. 349/61, 349/65, 67, 68
See application file for complete search history.

(56) References Cited

U.S. PATENT DOCUMENTS 7,273,310 B2 9/2007 Chen

*Primary Examiner*—Richard H Kim
(74) *Attorney, Agent, or Firm*—Wei Te Chung

(57) ABSTRACT

An exemplary backlight module (200) includes a light guide plate (210) having a light incident surface (211), and a light source assembly (220) provided adjacent to the light incident surface of the light guide plate. The light source assembly includes a light source (221) and a light reflector (225). The light source includes a first portion and a second portion. A brightness of light emitted from the first portion is less than that of light emitted from the second portion. The light reflector is configured for reflecting light beams emitted from the light source toward the light incident surface of the light guide plate. The light reflector includes a first region (226) corresponding to the first portion of the light source and a second region (227) corresponding to the second portion of the light source. A reflection capability of the first region is greater than that of the second region.

20 Claims, 3 Drawing Sheets

BACKLIGHT MODULE WITH LIGHT REFLECTOR HAVING PLURAL REFLECTION CAPABILITY AND LIQUID CRYSTAL DISPLAY USING SAME

FIELD OF THE INVENTION

The present invention relates backlight modules, and particularly to a backlight module which includes a light reflector having plural regions with different reflection capabilities.

GENERAL BACKGROUND

An LCD has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions. An LCD generally includes a liquid crystal panel, a driving circuit for driving the liquid crystal panel, and a backlight module for illuminating the liquid crystal panel.

Referring to FIG. 4, a typical backlight module 100 includes a light guide plate 110 having a light incident surface 111, a light source assembly 114, and a frame 116 for accommodating the light guide plate 110 and the light source assembly 114.

The light source assembly 114 includes a light source 117, a pair of fixing blocks 119, and a light reflector 118. The light source 117 can be a cold cathode fluorescent lamp (CCFL), and is positioned adjacent to the light incident surface 111 of the light guide plate 110. High and low voltages are applied to the two ends of the CCFL so that the CCFL lights up. The light reflector 118 has a generally U-shaped cross-section, and thus can accommodate the light source 117. The fixing blocks 119 are configured to fix the light source 117 to the light reflector 118. The light reflector 118 can reflect light beams toward the light guide plate 110, thereby increasing light utilization of the backlight module 100.

Generally, the brightness of the two ends of the CCFL is lower than the brightness of a middle portion of the CCFL. Thus the light guide plate 110 receives non-uniform incident light beams from the light source assembly 114, and the brightness of light output by the backlight module 100 may also be non-uniform. Accordingly, a liquid crystal display using the backlight module 100 may have impaired display quality.

Alternatively, the light source 117 can instead be a plurality of light emitting diodes (LEDs). In general, lower powered LEDs are used, in order to limit the amount of heat produced and limit power consumption. Therefore the brightness of this kind of backlight module 100 may be too low.

What is needed, therefore, is a new backlight module that can overcome the above-described deficiencies. What is also needed is an LCD using such backlight module.

SUMMARY

In one preferred embodiment, a backlight module includes a light guide plate having a light incident surface, and a light source assembly provided adjacent to the light incident surface of the light guide plate. The light source assembly includes a light source and a light reflector. The light source includes a first portion and a second portion. A brightness of light emitted from the first portion is less than a brightness of light emitted from the second portion. The light reflector is configured for reflecting light beams emitted from the light source toward the light incident surface of the light guide plate. The light reflector includes a first region corresponding to the first portion of the light source and a second region corresponding to the second portion of the light source. A reflection capability of the first region is greater than a reflection capability of the second region.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
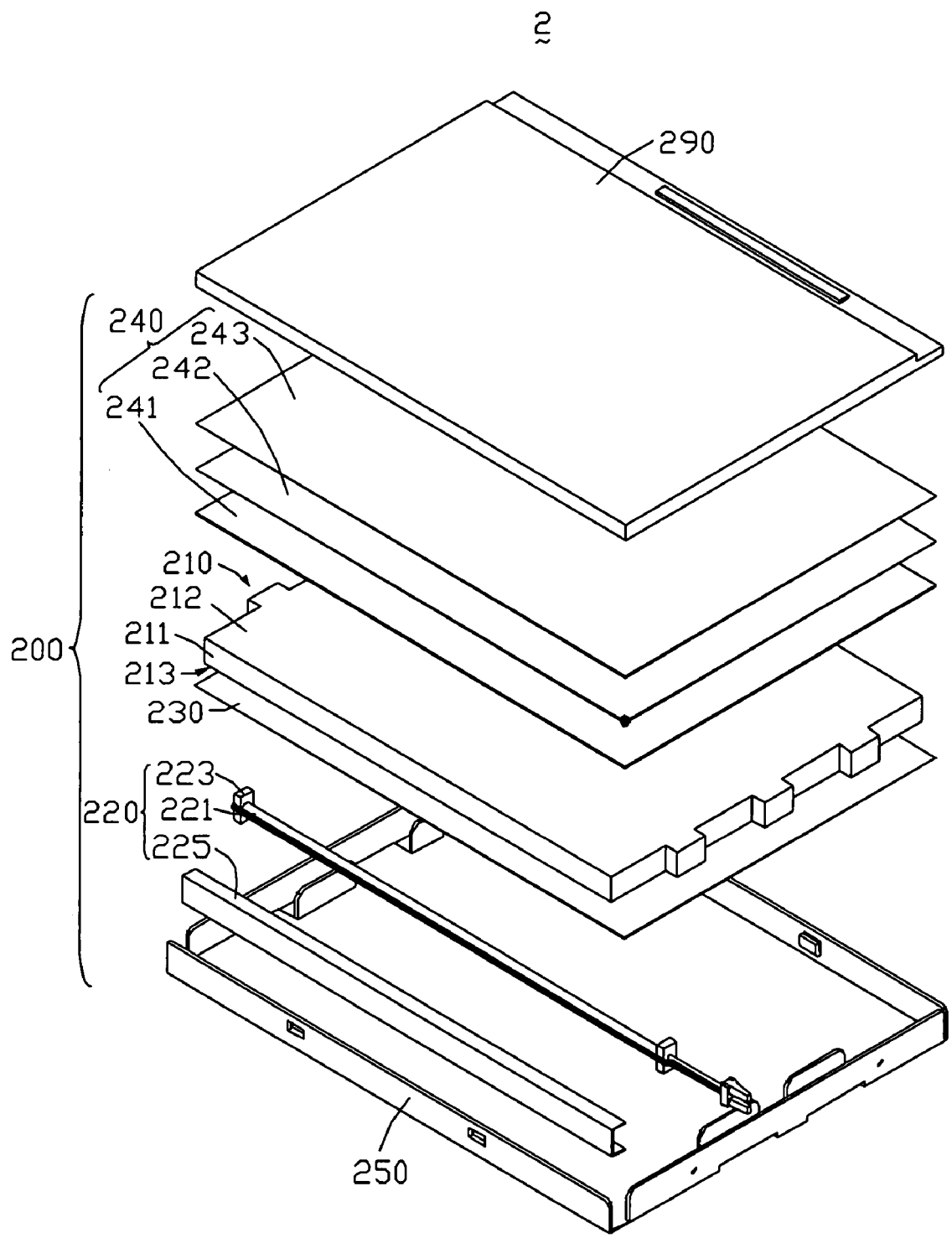
FIG. 1 is an exploded, isometric view of a liquid crystal display according to a first embodiment of the present invention, the liquid crystal display including a backlight module, the backlight module including a light reflector.

Referring to FIG. 1, a liquid crystal display 2 according to a first embodiment of the present invention is shown. The liquid crystal display 2 includes a liquid crystal panel 290, and a backlight module 200 for illuminating the liquid crystal panel 290. The backlight module 200 includes a light guide plate 210, a light source assembly, a reflective plate 230, an optical film assembly 240, and a frame 250 for accommodating the above components.

The light guide plate 210 includes a light incident surface 211, a top light emitting surface 212 adjoining the light incident surface 211, and a bottom surface 213. The optical film assembly 240 is positioned adjacent the light emitting surface 212, and includes a diffusing film 241, a lower brightness enhancement film (BEF) 242, and an upper brightness enhancement film (BEF) 243 arranged in that order from bottom to top. The reflective plate 230 is located adjacent the bottom surface 213 of the light guide plate 210.

The light source assembly 220 includes a light source 221, a pair of fixing blocks 223, and a light reflector 225. The light source 221 can be a linear light source, such as a cold cathode fluorescent lamp (CCFL). The light source 221 includes a middle portion (not labeled) and two end portions (not labeled). The light reflector 225 has a generally U-shaped cross-section so as to accommodate the light source 221. The fixing blocks 223 are configured to fix the light source 221 to the light reflector 225. The light reflector 225 can reflect light beams toward the light guide plate 210, thereby increasing light utilization of the backlight module 200.

Figure 2:
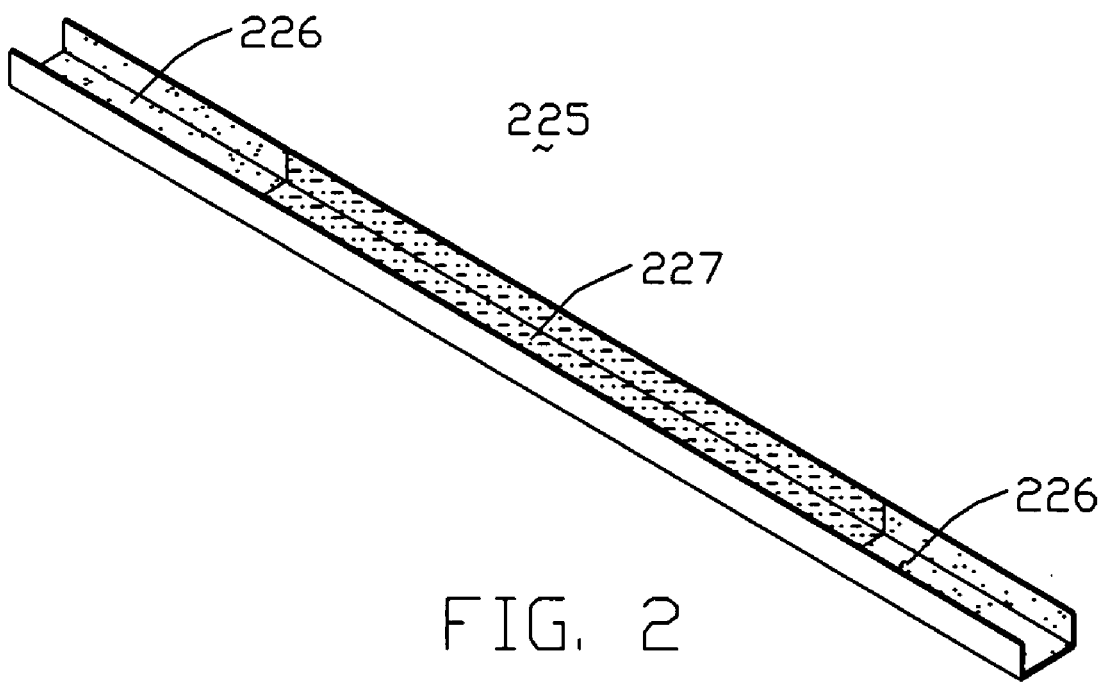
FIG. 2 is an enlarged, isometric view of the light reflector of FIG. 1.

Referring also to FIG. 2, the light reflector 225 defines a first region 226 and a second region 227 both at an inner surface (not labeled) thereof. The first region 226 is located at two ends of the light reflector 225, and corresponds to the end portions of the light source 211. The second region 227 is located at the middle of the light reflector 225, and corresponds to the middle portion of the light source 221. The light reflector 225 further includes a first reflective material coated on the first region 226 and a second reflective material coated on the second region 227. A reflection index of the first reflective material is greater than a reflective index of the second reflective material. The first reflective material can be ALSET SAS-B230 (which is manufactured by Mitsubishi Plastics Inc.). The second reflective material can be ALSET AL E60V (which is also manufactured by Mitsubishi Plastics Inc.).

In operation, after light beams are emitted from the light source 221, part of the light beams reach the first and second regions 226, 227 of the light reflector 225 and are reflected toward the light incident surface 211 of the light guide plate 210. Because the light reflector 225 has a higher reflection capability at the first region 226 corresponding to the end portions of the light source 221 which have a lower brightness, and has a lower reflection capability at the second region corresponding to the middle portion of the light source 221 which has a higher brightness, the light guide plate 210 can receive substantially uniform light beams from the light source assembly 220. Thus, the brightness of the backlight module 200 is substantially uniform, and therefore the display quality of the liquid crystal display 2 is improved.

Figure 3:
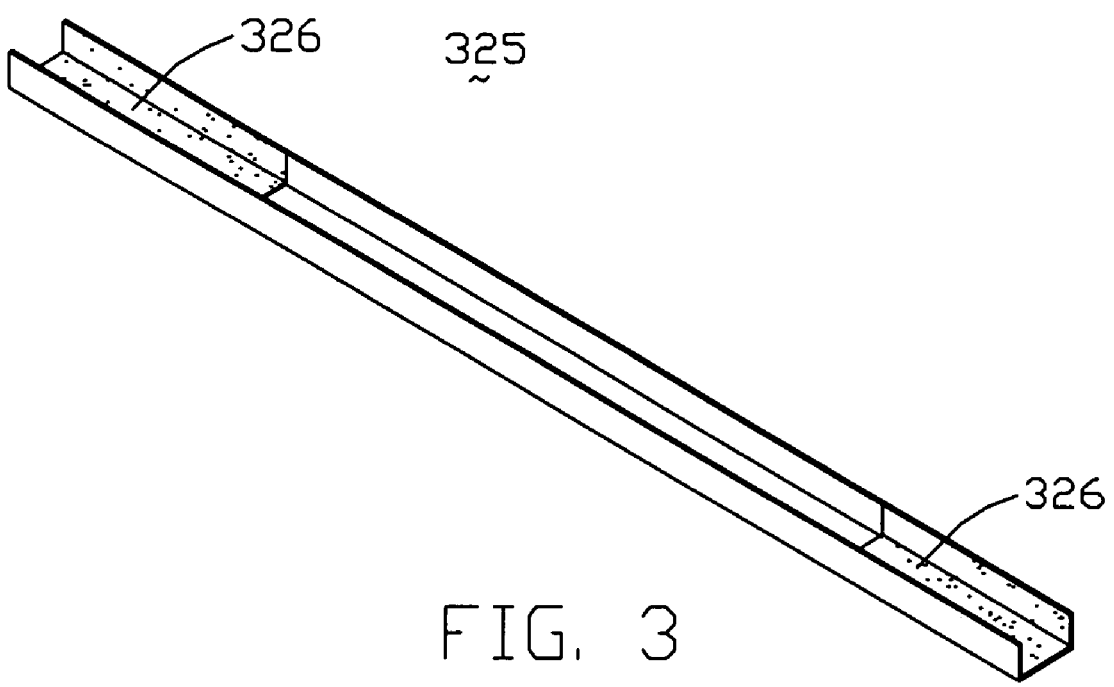
FIG. 3 is similar to FIG. 3, but showing a corresponding view in the case of a light reflector of a liquid crystal display according to a second embodiment of the present invention.
Figure 4:
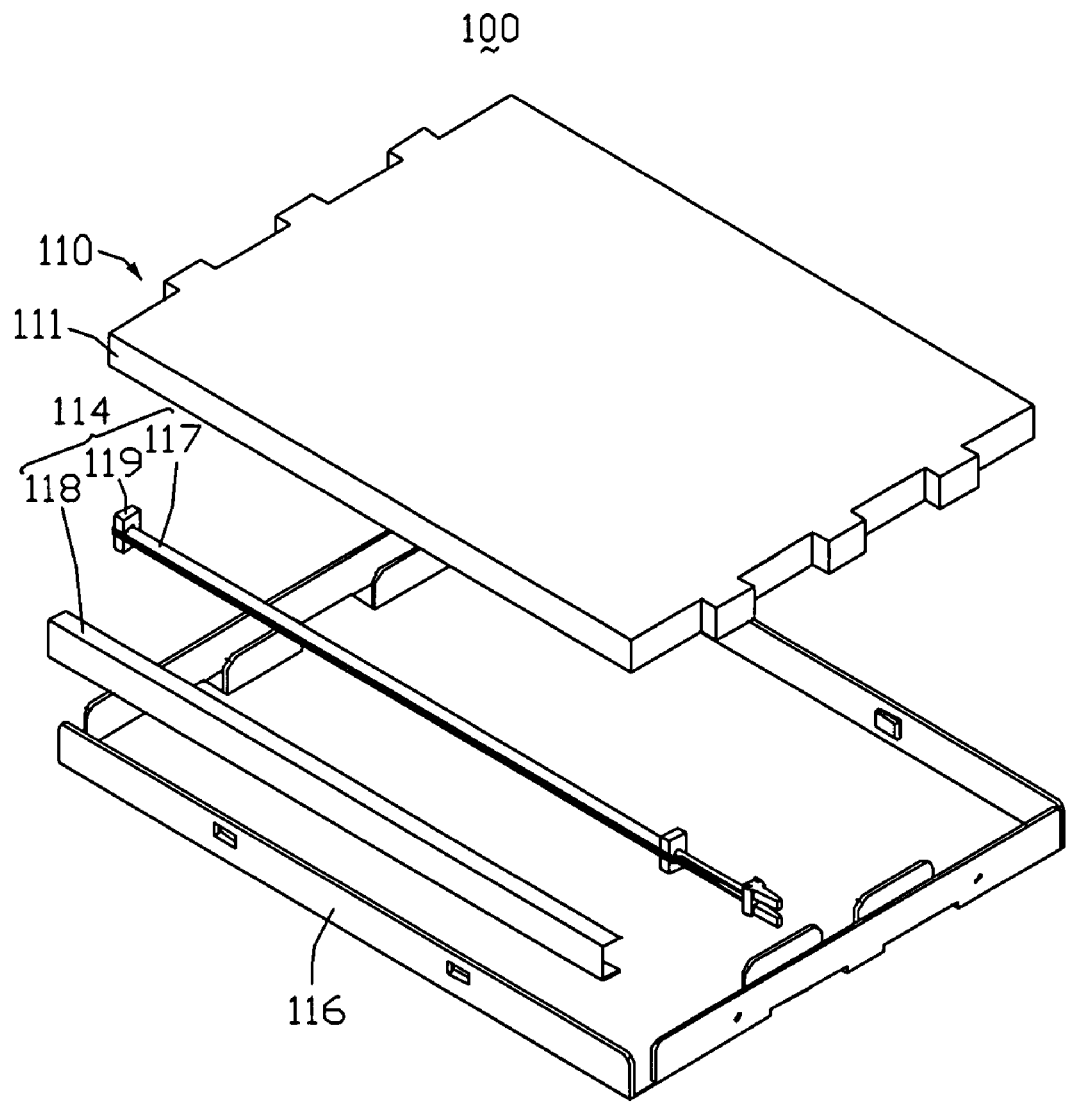
FIG. 4 is an exploded, isometric view of a conventional backlight module.

Referring to FIG. 3, a light reflector 325 of a backlight module of a liquid crystal display according to a second embodiment of the present invention is similar to the light reflector 225. However, the light reflector 325 includes a reflective material coated only on a first region 326 thereof. The reflective material has a reflection index higher than that of the light reflector 325 itself. The liquid crystal display has advantages similar to those described above in relation to the liquid crystal display 2 of the first embodiment.

Further or alternative embodiments may include the following. In a first example, the first reflective material can be an enhanced specular reflective material. This material has a reflection index of 98%. In a second example, the first and second reflective material can be sputtered on the light reflector 225. In a third example, the light source 221 can instead include a plurality of light emitting diodes (LEDs). In such case, some of the LEDs may be low powered, in order to limit the amount of heat produced and limit power consumption. The first region 226 having the first reflective material formed thereon corresponds to the low powered LEDs, and the second region 227 having the second reflective material formed thereon corresponds to high powered LEDs. In a fourth example, the light reflector 325 accommodates a light source which includes a plurality of LEDs. In such a case, the first region 336 having the reflective material formed thereon corresponds to low powered LEDs of the light source.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate comprising a light incident surface; and
   a light source assembly provided adjacent to the light incident surface of the light guide plate, the light source assembly comprising:
      a light source comprising a first portion and a second portion, a brightness of light emitted from the first portion being less than a brightness of light emitted from the second portion; and
      a light reflector configured for reflecting light beams emitted from the light source toward the light incident surface of the light guide plate, the light reflector comprising a first region corresponding to the first portion of the light source and a second region corresponding to the second portion of the light source, a reflection capability of the first region being greater than a reflection capability of the second region.

2. The backlight module as claimed in claim 1, wherein the light source is a cold cathode fluorescent lamp (CCFL), and the first portion comprises two end portions of the light source, and the second portion comprises a middle portion of the light source.

3. The backlight module as claimed in claim 2, wherein the light source assembly further comprises a fixing member, the fixing member being configured to fix the light source to the light reflector.

4. The backlight module as claimed in claim 2, wherein the light reflector further comprises a first reflective material formed on the first region and a second reflective material formed on the second region, a reflection index of the first reflective material being greater than a reflection index of the second reflective material.

5. The backlight module as claimed in claim 4, wherein the first and second reflective materials are coated on the light reflector.

6. The backlight module as claimed in claim 4, wherein the first and second reflective materials are sputtered on the light reflector.

7. The backlight module as claimed in claim 2, wherein the light reflector further comprises a reflective material formed on the first region, a reflection index of the reflective material being greater than a reflection index of the light reflector.

8. The backlight module as claimed in claim 1, wherein the first portion of the light source comprises at least one first light emitting diode, and the second portion of the light source comprises at least one second light emitting diode, the power of the at least one first light emitting diode being less than the power of the at least one first light emitting diode.

9. The backlight module as claimed in claim 8, wherein the light reflector further comprises a first reflective material formed on the first region and a second reflective material formed on the second region, a reflection index of the first reflective material being greater than a reflection index of the second reflective material.

10. The backlight module as claimed in claim 8, wherein the light reflector further comprises a reflective material formed on the first region, a reflection index of the reflective material being greater than a reflection index of the light reflector.

11. A liquid crystal display comprising:
    a liquid crystal panel; and
    a backlight module configured for illuminating the liquid crystal display, the backlight module comprising:
       a light guide plate comprising a light incident surface; and
       a light source assembly provided adjacent to the light incident surface of the light guide plate, the light source assembly comprising:
          a light source comprising a first portion and a second portion, a brightness of light emitted from the first portion is lower than a brightness of light emitted from the second portion; and
          a light reflector configured for reflecting light beams emitted from the light source toward the light incident surface of the light guide plate, the light reflector comprising a first region corresponding to the first portion of the light source and a second region corresponding to the second portion of the light source, a reflection capability of the first region being greater than a reflection capability of the second region.

12. The liquid crystal display as claimed in claim 11, wherein the light source is a cold cathode fluorescent lamp (CCFL), and the first portion comprises two end portions of the light source, and the second portion comprises a middle portion of the light source.

13. The liquid crystal display as claimed in claim 12, wherein the light reflector further comprises a first reflective material formed on the first region and a second reflective material formed on the second region, a reflection index of the first reflective material being greater than a reflection index of the second reflective material.

14. The liquid crystal display as claimed in claim 13, wherein the first and second reflective materials are coated on the light reflector.

15. The liquid crystal display as claimed in claim 13, wherein the first and second reflective materials are sputtered on the light reflector.

16. The liquid crystal display as claimed in claim 12, wherein the light reflector further comprises a reflective material formed on the first region, a reflection index of the reflective material being greater than a reflection index of the light reflector.

17. The liquid crystal display as claimed in claim 11, wherein the first portion of the light source comprises at least one first light emitting diode, and the second portion of the light source comprises at least one second light emitting diode, the power of the at least one first light emitting diode being less than the power of the at least one first light emitting diode.

18. The liquid crystal display as claimed in claim 17, wherein the light reflector further comprises a first reflective material formed on the first region and a second reflective material formed on the second region, a reflection index of the first reflective material being greater than a reflection index of the second reflective material.

19. The liquid crystal display as claimed in claim 17, wherein the light reflector further comprises a reflective material formed on the first region, a reflection index of the reflective material being greater than a reflection index of the light reflector.

20. A backlight module comprising:
a light guide plate; and
a light source assembly provided adjacent to the light guide plate, the light source assembly comprising:
a light source comprising a plurality of portions having different brightness outputs; and
a light reflector configured for reflecting light beams emitted from the light source toward the light guide plate, the light reflector comprising different regions having different reflection capabilities corresponding to the different portions of the light source respectively such that the light guide plate receives substantially uniform light beams from the light source assembly.

* * * * *